United States Patent
Mao et al.

(10) Patent No.: US 10,138,072 B2
(45) Date of Patent: Nov. 27, 2018

(54) PRODUCT CONVEYING DEVICE

(71) Applicants: Boe Technology Group Co., Ltd., Beijing (CN); HEFEI XINSHENG OPTOELECTRONICS TECHNOLOGY CO., LTD., Anhui (CN)

(72) Inventors: Lei Mao, Beijing (CN); Wei Dai, Beijing (CN); Yi Yang, Beijing (CN); He Miao, Beijing (CN); Fang Liu, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 51 days.

(21) Appl. No.: 15/327,040

(22) PCT Filed: Jul. 19, 2016

(86) PCT No.: PCT/CN2016/090405
§ 371 (c)(1),
(2) Date: Jan. 18, 2017

(87) PCT Pub. No.: WO2017/117969
PCT Pub. Date: Jul. 13, 2017

(65) Prior Publication Data
US 2018/0208403 A1    Jul. 26, 2018

(30) Foreign Application Priority Data
Jan. 4, 2016   (CN) ................... 2016 2 0012613 U

(51) Int. Cl.
*B65G 43/08*    (2006.01)

(52) U.S. Cl.
CPC ...... *B65G 43/08* (2013.01); *B65G 2203/0208* (2013.01); *B65G 2203/044* (2013.01); *B65G 2207/40* (2013.01)

(58) Field of Classification Search
CPC .............. B65G 43/08; B65G 2203/042; B65G 2203/044; B65G 2203/047
(Continued)

(56) References Cited

U.S. PATENT DOCUMENTS 3,485,339 A * 12/1969 Miller .................... B65G 43/08
                                                    198/460.1
4,429,781 A *  2/1984 Holzhauser ............ B65G 43/08
                                                    198/357
(Continued)

FOREIGN PATENT DOCUMENTS

CN       2871453       2/2007
CN     203382145       1/2014
(Continued)

OTHER PUBLICATIONS

International Search Report for PCT/CN2016/090405 dated Oct. 17, 2016.

*Primary Examiner* — James R Bidwell
(74) *Attorney, Agent, or Firm* — Calfee, Halter & Griswold LLP

(57) ABSTRACT

A conveyor includes a conveyor belt, a sensor and a controller, wherein the sensor includes a light ray generator, a light ray receiver and at least one baffle. The controller is connected with the light ray receiver for controlling the conveyor belt to stop moving in response to a signal fed back by the light ray receiver that the conveyed product has been conveyed to the end of the conveyor belt. The baffle has a light transmission hole to let the light ray emitted from the light ray generator pass through. The gap between a lower edge of the baffle and the conveyor belt is smaller than the (Continued)

thickness of the conveyed product. When the baffle is impinged by the conveyed product, the baffle will move along the conveying direction of the conveyor belt so as to block the light ray emitted from the light ray generator.

13 Claims, 2 Drawing Sheets

(58) Field of Classification Search
USPC .................. 198/781.05, 571, 572, 502.3
See application file for complete search history.

(56) References Cited

U.S. PATENT DOCUMENTS

| | | | | |
|---|---|---|---|---|
| 4,819,784 A | * | 4/1989 | Sticht | B07C 5/02 198/395 |
| 5,142,135 A | * | 8/1992 | Farchmin | G01B 11/00 250/206.1 |
| 5,230,418 A | * | 7/1993 | Agnoff | G01P 3/486 198/502.4 |
| 5,927,475 A | * | 7/1999 | Santicchi | B65G 43/08 198/464.1 |
| 6,843,362 B2 | * | 1/2005 | Tachibana | B65G 43/10 198/460.1 |
| 6,847,859 B2 | * | 1/2005 | Nuebling | G01B 11/04 198/502.2 |
| 2010/0260378 A1 | * | 10/2010 | Noy | G01B 11/24 382/103 |
| 2013/0260448 A1 | * | 10/2013 | Wilson | G01B 11/14 435/288.7 |

FOREIGN PATENT DOCUMENTS

| | | |
|---|---|---|
| CN | 203529387 | 4/2014 |
| CN | 203624464 | 6/2014 |
| CN | 205274562 | 6/2016 |
| JP | H02143115 A | 6/1990 |
| JP | H02143118 A | 6/1990 |

* cited by examiner

PRODUCT CONVEYING DEVICE

RELATED APPLICATIONS

The present application is the U.S. national phase entry of PCT/CN2016/090405, with an international filing date of Jul. 19, 2016, which claims the benefit of Chinese Patent Application No. 201620012613.1, filed on Jan. 4, 2016, the entire disclosure of which is incorporated herein by reference.

FIELD OF THE DISCLOSURE

The present disclosure relates to the field of convey technique, in particular to a conveyor.

DESCRIPTION OF THE PRIOR ART

Conveyor is a commonly used apparatus in production process. It generally comprises a conveyor belt. In practical production process, a conveyed product should be taken off the conveyor belt in time before it reaches to the end of the conveyor belt, so as to prevent the conveyed product from falling off the end of the conveyor belt and being damaged.

In order to solve the problem, the existing conveyor further includes a sensor and a controller, wherein the sensor includes an infrared ray generator and an infrared ray receiver disposes at two sides of the end of the conveyor belt respectively. The controller is connected with the infrared ray receiver and controls the conveyor belt to stop moving in response to a signal fed back by the infrared ray receiver that the conveyed product has been conveyed to the end of the conveyor belt. Specifically, the conveyor having the above structure controls the conveyor belt in the following way: before the conveyed product reaches to the end of the conveyor belt, the conveyed product will not block the infrared ray emitted by the infrared ray generator, and the infrared ray receiver can receive the infrared ray, therefore the conveyor belt conveys products normally; when the conveyed product reaches to the end of the conveyor belt, the conveyed product will block the infrared ray emitted by the infrared ray generator so that the infrared ray receiver cannot receive the infrared ray, and the infrared ray receiver will send a feedback signal to the controller that the conveyed product has been conveyed to the end of the conveyor belt, therefore the controller will control the conveyor belt to stop moving in response to the feedback signal so as to prevent the conveyed product from falling off the end of the conveyor belt and being damaged.

However, the present inventor finds that when the thickness of the conveyed product is smaller than a distance between the infrared ray and the conveyor belt, even if the conveyed product has reached the end of the conveyor belt, the conveyed product cannot block the infrared ray emitted by the infrared ray generator, and the infrared ray receiver can still receive the infrared ray so that the conveyor belt will still convey product normally and cannot prevent the conveyed product from falling off the end of the conveyor belt and being damaged.

SUMMARY OF THE DISCLOSURE

The object of the present disclosure is to provide a conveyor which is used to prevent the conveyed product from falling off an end of the conveyor belt and being damaged.

In order to realize the above object, the conveyor of the present disclosure employs the following technical solution:

a conveyor, comprising a conveyor belt, a sensor and a controller, wherein the sensor comprises: a light ray generator and a light ray receiver disposed at two sides of the end of the conveyor belt respectively; and at least one baffle disposed between the light ray generator and the light ray receiver, wherein a conveyed product will impinge the at least one baffle when the conveyed product is conveyed to the vicinity of the end of the conveyor belt. The controller is connected with the light ray receiver for controlling the conveyor belt to stop moving in response to a signal fed back by the light ray receiver that the conveyed product has been conveyed to the end of the conveyor belt. The baffle has a light transmission hole to let the light ray emitted from the light ray generator pass through. The gap between a lower edge of the baffle and the conveyor belt is smaller than a thickness of the conveyed product; when the baffle is impinged by the conveyed product, the baffle will move along a conveying direction of the conveyor belt so as to block the light ray emitted from the light ray generator.

The sensor comprises the light ray generator and the light ray receiver disposed at two sides of the end of the conveyor belt respectively, and at least one baffle disposed between the light ray generator and the light ray receiver, wherein the conveyed product impinges the baffle near the end of the conveyor belt, the controller is connected with the light ray receiver for controlling the conveyor belt to stop moving in response to the signal fed back by the light ray receiver that the conveyed product has been conveyed to the end of the conveyor belt. The baffle has a light transmission hole to let the light ray emitted from the light ray generator pass through. The gap between the lower edge of the baffle and the conveyor belt is smaller than the thickness of the conveyed product. When the baffle is impinged by the conveyed product, the baffle will move along the conveying direction of the conveyor belt so as to block the light ray emitted from the light ray generator. Therefore, when the conveyed product is conveyed near the end of the conveyor belt, the conveyed product will contact with the lower edge of the baffle, so that the baffle will move along the conveying direction of the conveyor belt due to the impingement of the conveyed product. Therefore the position of the light transmission hole is offset so that the baffle can block the light ray emitted by the light ray generator and the light ray receiver will not receive the light ray. Thus, the light ray receiver will feed back a signal to the controller that the conveyed product has been conveyed to the end of the conveyor belt. In turn, the controller will control the conveyor belt to stop moving in response to the feedback signal so as to prevent the conveyed product from falling off the end of the conveyor belt and being damaged.

BRIEF DESCRIPTION OF DRAWINGS

In order to clearly illustrate the embodiments of the present disclosure or the technical solution in prior at, the drawings used in the description of the embodiments will be explained simply. Obviously, the drawings in the following description are only showing some embodiments of the present disclosure. As to those skilled in the art, they can obtain other drawings based on these drawings without creative efforts.

DETAILED DESCRIPTION OF THE PRESENT DISCLOSURE

The technical solution according to the present embodiment will be described clearly and thoroughly in conjunction with the drawings. Obviously, the described embodiment is only part of the embodiments of the present disclosure, not all the embodiments of the present disclosure. Based on the embodiments of the present disclosure, those skilled in the art can obtain all the other embodiments without creative efforts and all the other embodiments are within the scope of the present disclosure.

Figure 1:
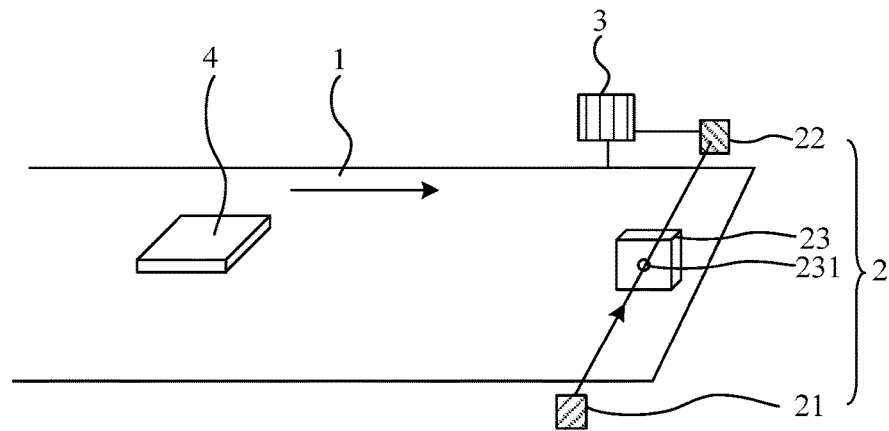
FIG. 1 is a schematic view of a conveyor according to a first embodiment of the present disclosure.

The present disclosure provides a conveyor. As shown in FIG. 1, the conveyor comprises a conveyor belt 1, a sensor 2 and a controller 3, wherein the sensor 2 includes: a light ray generator 21 and a light ray receiver 22 disposed at two sides of an end of the conveyor belt 1 respectively; and at least one baffle 23 (only one baffle is shown in the drawing for illustration) disposed between the light ray generator 21 and a light ray receiver 22. Wherein a conveyed product 4 will impinge the at least one baffle 23 when the conveyed product 4 is conveyed to the vicinity of the end of the conveyor belt 1, the controller 3 is connected with the light ray receiver 22 for controlling the conveyor belt 1 to stop moving in response to a signal fed back by the light ray receiver 22 that the conveyed product 4 has been conveyed to the end of the conveyor belt 1. The baffle 23 has a light transmission hole 231 to let the light ray emitted from the light ray generator 21 pass. A gap between a lower edge of the baffle 23 and the conveyor belt 1 is smaller than the thickness of the conveyed product 4. When the baffle 23 is impinged by the conveyed product, the baffle 23 will move along the conveying direction of the conveyor belt 1 so as to block the light ray emitted from the light ray generator 21.

In the description, the above mentioned "the baffle 23 will move along the conveying direction of the conveyor belt 1" comprises several situations, for example, the baffle 23 will translate along the conveying direction of the conveyor belt 1, or alternatively the baffle 23 will rotate along the conveying direction of the conveyor belt 1, or alternatively the baffle 23 will both translate along the conveying direction of the conveyor belt 1 and rotate along the conveying direction of the conveyor belt 1.

It should be noted that when the radius of the light transmission hole 231 is large, it is required a large movement distance for the baffle 23 to block the light ray emitted from the light ray generator 21. In this situation, there is a risk that the conveyed product 4 might fall off the end of the conveyor belt 1 and be damaged because the conveyor belt 1 cannot stop in time. When the radius of the light transmission hole 231 is small, a slight disturbance from the outside (such as an air flow disturbance in the manufacturing shop) might move the baffle 23 and block the light ray emitted from the light ray generator 21 so that the conveyor belt 1 will stop moving and the production cannot be performed smoothly. In this situation, the radius of the light transmission hole 231 should be designed reasonably based on practical situation (such as the dimension of the baffle 23).

In addition, the surface of the baffle 23 can also be provided with an anti-static layer so that static electricity caused by the fiction between the baffle 23 and the conveyed product 4 can be avoided. Thus, the damage to the conveyed product 4 caused by static electricity can be prevented. The material of the baffle 23 can be plastic, and therefore the weight of the baffle 23 is relatively light so that the conveyed product 4 can drive the baffle 23 to move along the conveying direction of the conveyor belt 1 easily. For example, the material of the baffle 23 is polyvinyl chloride.

The sensor includes the light ray generator 21 and the light ray receiver 22 disposed at two sides of the end of the conveyor belt 1 respectively, and the baffle 23 disposed between the light ray generator 21 and the light ray receiver 22, wherein the conveyed product 4 impinges the baffle 23 near the end of the conveyor belt, the controller 3 is connected with the light ray receiver 22, and therefore control the conveyor belt 1 to stop moving in response to the signal fed back by the light ray receiver 22 that the conveyed product has been conveyed to the end of the conveyor belt 1. The baffle 23 has the light transmission hole 231 to let the light ray pass through. The gap between the lower edge of the baffle 23 and the conveyor belt 1 is smaller than the thickness of the conveyed product. When the baffle 23 is impinged by the conveyed product 4, the baffle 23 will move along the conveying direction of the conveyor belt 1 so as to block the light ray emitted from the light ray generator 21. Therefore, when the conveyed product 4 is conveyed near the end of the conveyor belt 1, the conveyed product 4 will contact with the lower edge of the baffle 23, so that the baffle 23 will move along the conveying direction of the conveyor belt 1 due to the impingement of the conveyed product 4. Therefore the position of the light transmission hole is offset so that the baffle 23 can block the light ray emitted by the light ray generator 21 and thus the light ray receiver 22 cannot receive the light ray. Therefore, the light ray receiver 22 will feed back a signal to the controller 3 that the conveyed product 4 has been conveyed to the end of the conveyor belt 1. In turn, the controller 3 will control the conveyor belt 1 to stop moving in response to the feedback signal so as to prevent the conveyed product 4 from falling off the end of the conveyor belt 1 and being damaged.

Besides the above mentioned beneficial effects, the conveyor according to the embodiment of the present disclosure has the following beneficial effects: in the conveyor of the present disclosure, the light ray generator 21 and the light ray receiver 22 are disposed at two sides of the end of the conveyor belt 1 respectively, so that when the conveyed product 4 is conveyed to the end of the conveyor belt 1, the conveyed product 4 will not contact with the light ray generator 21 and the light ray receiver 22. Thus, the light ray generator 21 and the light ray receiver 22 will not be impinged and damaged, so that the sensor 2 can be used normally.

Figure 2:
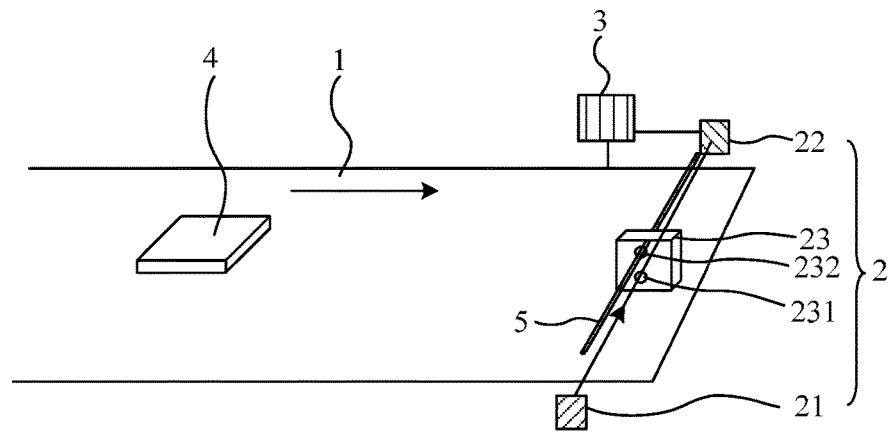
FIG. 2 is a schematic view of a conveyor according to a second embodiment of the present disclosure.

In addition, as shown in FIG. 2, the sensor 2 further comprises a support shaft 5 disposed above the end of the conveyor belt 1 and spanning the conveyor belt 1. An included angle between the axial direction of the support shaft 5 and the conveying direction of the conveyor belt 1 is larger than zero degree, and the baffle is mounted to the support shaft 5. Therefore, the movement of the baffle 23 along the conveying direction of the conveyor belt 1 can be achieved by the support shaft 5.

The inventor of the application finds that when the included angle between the axial direction of the support shaft 5 and the conveying direction of the conveyor belt 1 is not 90 degree, the conveyed product 4 might contact the lower edge of the baffle 23 even when the conveyed product 4 has not been conveyed to the end of the conveyor belt 1 yet, causing the conveyor belt 1 to stop moving unexpectedly so that the production cannot be performed smoothly. When the included angle between the axial direction of the support shaft 5 and the conveying direction of the conveyor belt 1 is 90 degree, no matter what position the conveyed product 4 is placed on the conveyor belt 1, the conveyed product 4 can contact the lower edge of the baffle 23 only when the conveyed product 4 is conveyed to the end of the conveyor belt 1 so that the conveyor belt 1 will not stop moving unexpectedly and the production can be performed smoothly. Therefore, in the present embodiment, the included angle between the axial direction of the support shaft 5 and the conveying direction of the conveyor belt 1 can be 90 degree.

Furthermore, the way that the movement of the baffle 23 along the conveying direction of the conveyor belt can be achieved by the support shaft 5 can be realized in the following two different embodiments:

First Embodiment

The support shaft 5 can move along the conveying direction of the conveyor belt 1, and the baffle 23 is fixedly mounted to the support shaft 5. When the conveyed product 4 is conveyed to the end of the conveyor belt 1, the conveyed product 4 will contact the baffle 23, so that the baffle 23 can drive the support shaft 5 to move along the conveying direction of the conveyor belt 1 together. Thereby, the position of the light transmission hole 231 in the baffle 23 can be offset, and thus the baffle 23 will block the light ray emitted from the light ray generator 21 so that the light ray receiver 22 cannot receive the light ray. The light ray receiver 22 will send a feedback signal to the controller 3 that the conveyed product 4 has been conveyed to the end of the conveyor belt 1. Then the controller 3 will control the conveyor belt 1 to stop moving in response to the feedback signal so as to prevent the conveyed product 4 from falling off the conveyor belt 1 and being damaged.

The ways that the support shaft 5 moves along the conveying direction of the conveyor belt 1 can be in the following ways: the support shaft 5 can translate along the conveying direction of the conveyor belt 1; the conveying direction of the conveyor belt is the direction along which the conveyed product is conveyed to the destination by the conveyor belt; or alternatively the support shaft 5 can rotate. Exemplarily, in order to translate the support shaft 5 along the conveying direction of the conveyor belt 1, the conveyor according to the embodiment of the present disclosure further includes a sliding slot and a sliding block cooperating with each other and disposed at two sides of the end of the conveyor belt 1. The two ends of the support shaft 5 are fixed on the sliding block, so that the sliding block can translate in the sliding slot along the conveying direction of the conveyor belt 1 so as to realize the translation of the support shaft 5 along the conveying direction of the conveyor belt 1. In order to rotate the support shaft 5, the conveyor according to the embodiment of the disclosure further comprises bearings disposed at two sides of the end of the conveyor belt 1. The two ends of the support shaft 5 are mounted in an inner rings of the bearings, so as to realize the rotation of the support shaft 5 through the rotation of the bearings.

Second Embodiment

The support shaft 5 is fixed above the end of the conveyor belt 1 and spanning the conveyor belt 1. The baffle 23 is pivotally mounted to the support shaft 5. When the conveyed product 4 is conveyed to the end of the conveyor belt 1, the conveyed product 4 will contact the baffle 23, and thus the baffle 23 can rotate around the support shaft 5, so that the baffle 23 will block the light ray emitted from the light ray generator 21, thereby the light ray receiver 22 cannot receive the light ray. Then the light ray receiver 22 will send a feedback signal to the controller 3 that the conveyed product 4 has been conveyed to the end of the conveyor belt 1. Then the controller 3 will control the conveyor belt 1 to stop moving according to the feedback signal, thereby preventing the conveyed product 4 from falling off the conveyor belt 1 and being damaged. Exemplarily, in order to fix the support shaft 5 above the end of the conveyor belt 1, the conveyor according to the embodiment of the present disclosure further comprises fixing seats disposed at two sides of the end of the conveyor belt 1 respectively. The two ends of the support shaft 5 are fixed in the fixing seats.

In the second embodiment, because the baffle 23 can rotate around the support shaft 5, after the conveyed product 4 is taken off the end of the conveyor belt 1, the baffle 23 will rotate under the gravity itself and then restore to its original position (that is, the light transmission hole 231 of the baffle 23 is in a position to let the light ray pass) without exerting external force, thereby saving production time and production cost. Therefore, in the embodiment of the present disclosure, the support shaft 5 can be fixed above the end of the conveyor belt 1 and spanning the conveyor belt 1, and the baffle 23 is pivotally mounted to the support shaft 5.

Of course, the manners that the baffle 23 moves along the conveying direction of the conveyor belt 1 by the support shaft 5 are not limited to the above mentioned two embodiments. It can be realized in other reasonable ways by those skilled in the art, which will not be described in detail herein.

Figure 3:
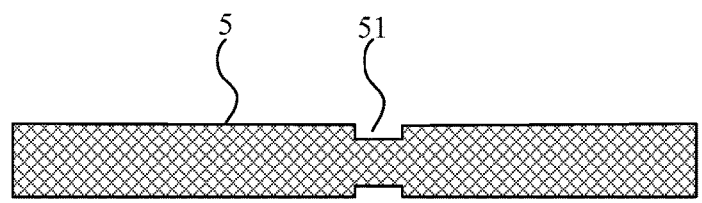
FIG. 3 is a support shaft according to an embodiment of the present disclosure.

Furthermore, when the support shaft 5 is fixed above the end of the conveyor belt 1 and spanning the conveyor belt 1 and the baffle 23 is pivotally mounted to the support shaft 5, as shown in FIG. 3, the support shaft 5 has an annular retaining groove 51, and the baffle has a mounting hole 232. The mounting hole 232 of the baffle 23 is snapped in the annular retaining groove 51. Therefore, the baffle can rotate relative to the support shaft 5, so that the annular retaining groove 51 can limit the movement of the baffle 23 along the axial direction of the support shaft 5. Thus, the baffle 23 can be located in a predetermined region above the end of the conveyor belt 1 all the time, and it can be ensured that when the conveyed product 4 has been conveyed to the end of the conveyor belt 1, the conveyed product 4 can contact the lower edge of the baffle 23.

Specifically, the width of the annular retaining groove 51 is slightly larger than the thickness of the baffle 23 so that the baffle 23 can be snapped in the annular retaining groove 51 and the cooperation between the baffle 23 and the annular retaining groove 51 is in a clearance fit. Thereby the conveyed product 4 can drive the baffle 23 to rotate around the support shaft 5 easily, avoiding the situation that the baffle 23 cannot rotate because the cooperation between the baffle 23 and the annular retaining groove 51 is too tight.

Figure 4:
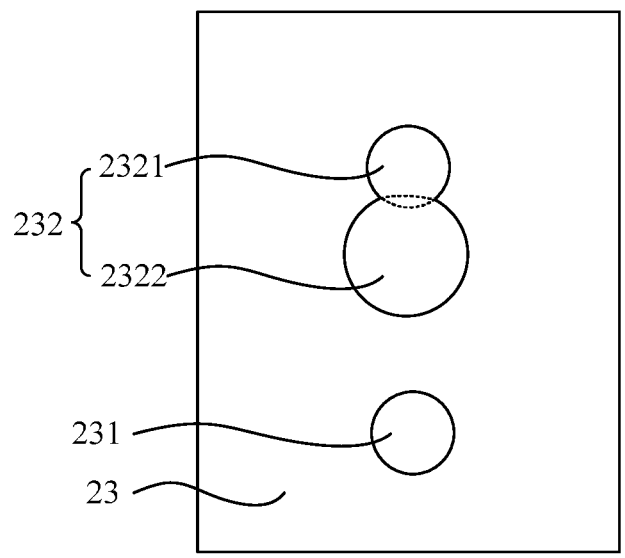
FIG. 4 is a schematic view of a baffle according to an embodiment of the present disclosure.
Figure 5:
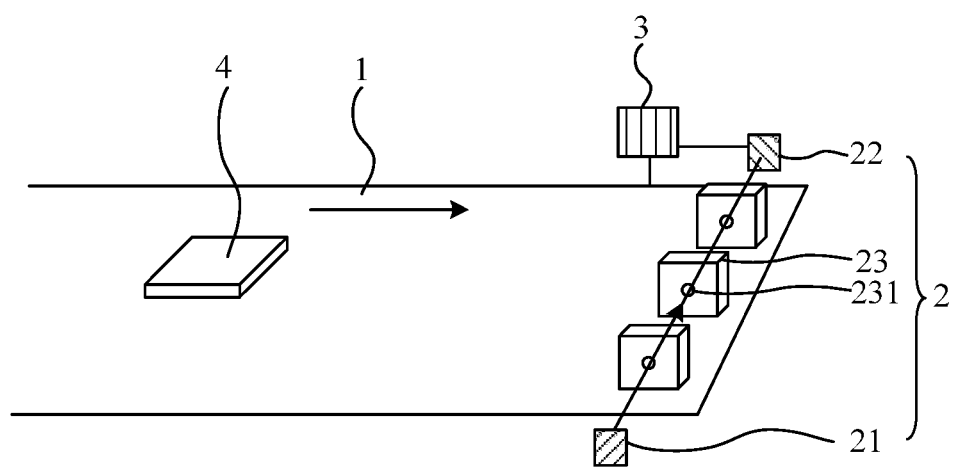
FIG. 5 is another example of FIG. 1, in which one baffle is replaced with three baffles.

Furthermore, as shown in FIG. 4, the mounting hole 232 comprises a first sub-mounting hole 2321 and a second sub-mounting hole 2322 communicated with each other. The first sub-mounting hole 2321 is located above the second sub-mounting hole 2322, the radius of the first sub-mounting hole 2321 is smaller than the radius of the support shaft 5 and larger than the radius of a portion of the support shaft 5 at the position where the annular retaining groove 51 is located. The portion of the support shaft 5 at the position where the annular retaining groove 51 is located is snapped into the first sub-mounting hole 2321, so that the baffle 23 can be stably snapped into the annular retaining groove 51 so as to prevent the baffle 23 from disengaging from the annular retaining groove 51 during rotation around the support shaft 5. Therefore the annular retaining groove 51 can limit the movement of the baffle 23 along the axial direction of the support shaft 5.

The assembly process of the baffle 23 as shown in FIG. 4 to the support shaft 5 as shown in FIG. 3 is as follows: first, the support shaft 5 passes through the second sub-mounting hole 2322 of the baffle 23 until the portion of the shaft 5 at the position where the annular retaining groove 51 is located is aligned with the second sub-mounting hole 2322; then the support shaft 5 is lifted upwards so that the annular retaining groove 51 of the support shaft 5 is snapped into the first sub-mounting hole 2321.

In addition, in order to let those skilled in the art conveniently practice the embodiments according to the present disclosure, the dimension of the support shaft 5 will be illustrated exemplarily.

Exemplarily, the baffle 23 is a rectangular parallelepiped, the length of the baffle 23 is about 39.8 mm to 40.2 mm, the width of the baffle 23 is about 19.8 mm to 20.2 mm, the thickness of the baffle 23 is about 2.8 mm to 3.2 mm. The radius of the light transmission hole 231 is about 2.5 mm to 3.5 mm. The width of the annular retaining groove 51 is about 3 mm to 4 mm. The radius of the first sub-mounting hole 2321 is about 3.5 mm to 4.5 mm, the radius of the second sub-mounting hole 2322 is about 4.5 mm to 5.5 mm. The radius of the support shaft 5 is about 4 mm to 5 mm. The radius of the portion of the support shaft at the position where the annular retaining groove is located is about 3 mm to 4 mm.

It should be noted that as to the specific baffle 23 and the support shaft 5, the width of the annular retaining groove 51 should be larger than the thickness of the baffle 23 so that the baffle 23 can be snapped into the annular retaining groove 51. For example, when the thickness of the baffle 23 is about 3.2 mm, the width of the annular retaining groove 51 should be larger than about 3.2 mm and smaller or equal to about 4 mm. Similarly, the specific dimensions of other portions in the baffle 23 and the support shaft 5 also have a corresponding constraint relationship which will not be described in more detail.

Moreover, the number of the baffles 23 can be more than two and each baffle 23 is mounted to the support shaft 5 at equal interval. No matter what positions the conveyed products 4 are placed on the conveyor belt 1, all the conveyed products 4 will contact the lower edge of the baffle 23 when the conveyed products 4 are conveyed to the end of the conveyor belt 1. Then the conveyed product 4 can drive the baffle 23 to move along the conveying direction of the conveyor belt 1 so that the position of the light transmission hole 231 is offset. Thereby the baffle 23 can block the light ray emitted from the light ray generator 21 so that the light ray receiver 22 cannot receive the light ray. Then the light ray receiver 22 will send a feedback signal to the controller 3 that the conveyed product 4 has been conveyed to the end of the conveyor belt 1. The controller 3 will control the conveyor belt 1 to stop moving in time according to feedback signal, preventing the conveyed product 4 from falling off the conveyor belt 1 and being damaged.

In the description, the number of the baffle 23 is related to the dimension of the conveyed product 4. When the dimension of the conveyed product 4 is relatively smaller, the number of the baffle 23 is relatively larger. When the dimension of the conveyed product 4 is relatively larger, the number of the baffles 23 is relatively smaller.

The above description is only exemplary embodiments of the present disclosure. However, the scope of the present disclosure is not restricted to those embodiments. Within the technical scope disclosed herein, various variations or substitutions will occur to those skilled in the art within the scope of the present disclosure. Therefore, the protection scope of the present disclosure should be the protection scope of the claims.

What is claimed is:

1. A conveyor comprising:

a conveyor belt, a sensor and a controller, wherein the sensor comprises a light ray generator and a light ray receiver each disposed at two opposing sides of an end of the conveyor belt and at least one baffle disposed between the light ray generator and the light ray receiver, wherein a conveyed product impinges the at least one baffle when the conveyed product is conveyed to the vicinity of the end of the conveyor belt, the controller is connected with the light ray receiver for controlling the conveyor belt to stop moving in response to a signal fed back by the light ray receiver that the conveyed product has been conveyed to the end of the conveyor belt, wherein the baffle has a light transmission hole to let the light ray emitted from the light ray generator pass through, wherein a gap between a lower edge of the baffle and the conveyor belt is smaller than the thickness of the conveyed product; when the baffle is impinged by the conveyed product, the baffle will move along a conveying direction of the conveyor belt so as to block the light ray emitted from the light ray generator.

2. The conveyor according to claim 1, wherein the sensor further comprises a support shaft disposed above the end of the conveyor belt and spanning the conveyor belt, an included angle between an axial direction of the support shaft and the conveying direction of the conveyor belt is larger than zero degree, and the baffle is mounted to the support shaft.

3. The conveyor according to claim 2, wherein the number of the at least one baffle is more than two; each baffle is mounted to the support shaft at equal interval.

4. The conveyor according to claim 2, wherein the included angle between the axial direction of the support shaft and the conveying direction of the conveyor belt is 90 degree, the support shaft can move along the conveying direction of the conveyor belt, and the baffle is fixedly mounted to the support shaft.

5. The conveyor according to claim 2, wherein the included angle between the axial direction of the support shaft and the conveying direction of the conveyor belt is 90 degree, the support shaft is fixed, the baffle is movably mounted to the support shaft.

6. The conveyor according to claim 5, wherein the support shaft has an annular retaining groove, the baffle has a mounting hole, and the mounting hole of the baffle is mounted in the annular retaining groove and can be rotated relative to the support shaft.

7. The conveyor according to claim 6, wherein a thickness of the baffle is about 2.8 mm to 3.2 mm, a width of the annular retaining groove is about 3 mm to 4 mm.

8. The conveyor according to claim 6, wherein the mounting hole comprises a first sub-mounting hole and a second sub-mounting hole communicated with each other, wherein the first sub-mounting hole is located above the second sub-mounting hole, a radius of the first sub-mounting hole is smaller than a radius of the support shaft and larger than a radius of a portion of the support shaft at a position where the annular retaining groove is located, and the annular retaining groove of the support shaft is snapped into the first sub-mounting hole.

9. The conveyor according to claim 8, wherein the radius of the first sub-mounting hole is about 3.5 mm to 4.5 mm, a radius of the second sub-mounting hole is about 4.5 mm to 5.5 mm, the radius of the support shaft is about 4 mm to 5 mm, and the radius of the portion of the support shaft at the position where the annular retaining groove is located is about 3 mm to 4 mm.

10. The conveyor according to claim 1, wherein the baffle is a rectangular parallelepiped, a length of the baffle is about 39.8 mm to 40.2 mm, a width of the baffle is about 19.8 mm to 20.2 mm, and a radius of the light transmission hole is about 2.5 mm to 3.5 mm.

11. The conveyor according to claim 1, wherein a surface of the baffle has an anti-static layer.

12. The conveyor according to claim 3, wherein the included angle between the axial direction of the support shaft and the conveying direction of the conveyor belt is 90 degree, the support shaft can move along the conveying direction of the conveyor belt, the baffle is fixedly mounted to the support shaft.

13. The conveyor according to claim 3, wherein the included angle between the axial direction of the support shaft and the conveying direction of the conveyor belt is 90 degree, the support shaft is fixed, the baffle is movably mounted to the support shaft.

* * * * *